United States Patent [19]
Barros

[11] 3,999,089
[45] Dec. 21, 1976

[54] NON-POLLUTANT FUEL GENERATOR AND FUEL BURNER WITH A NON-POLLUTANT EXHAUST AND SUPPLEMENTARY D. C. GENERATOR

[76] Inventor: Maurice Jay Barros, 541 Westwood Drive, Dover, Del. 19901

[22] Filed: Mar. 1, 1974

[21] Appl. No.: 447,352

[52] U.S. Cl. ................................................. 310/11
[51] Int. Cl.² .......................................... H02N 4/02
[58] Field of Search ..................................... 310/11

[56] References Cited
UNITED STATES PATENTS 3,161,789   12/1964   Nagamatsu et al. .................. 310/11

*Primary Examiner*—Donovan F. Duggan
*Attorney, Agent, or Firm*—Jones, Tullar & Cooper

[57] ABSTRACT

A system for generating non-polluting fuel and a burner for using such fuel to produce energy in the form of heat with a non-polluting exhaust, together with means for utilizing such exhaust to produce supplementary direct current power is disclosed. An electrolyzer is operated to produce hydrogen and oxygen in gaseous form which is then stored in suitable fuel tanks. As needed, the fuel is combined with air and supplied under pressure to a combustion chamber where the mixture is burned, producing heat and a pollution free exhaust. The heat so produced may be used as a conventional heat source to generate steam, drive a turbine, or the like, while the combustion gases are directed to a magnetohydrodynamic generator to produce an electrical current which is usable in any desired manner.

3 Claims, 7 Drawing Figures

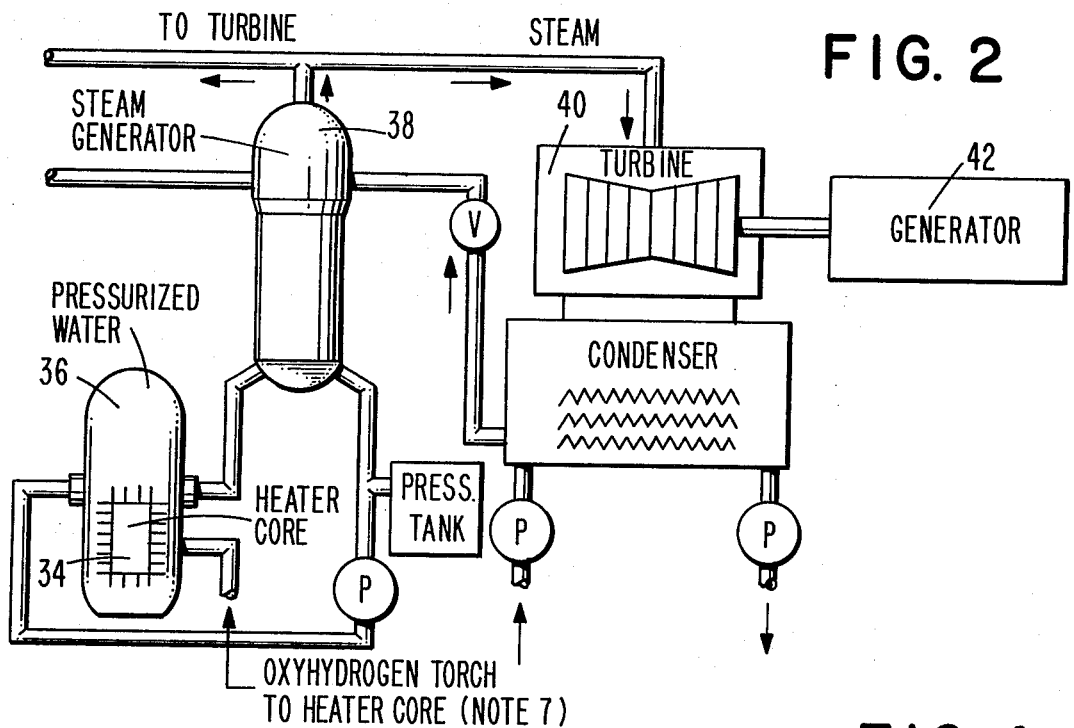
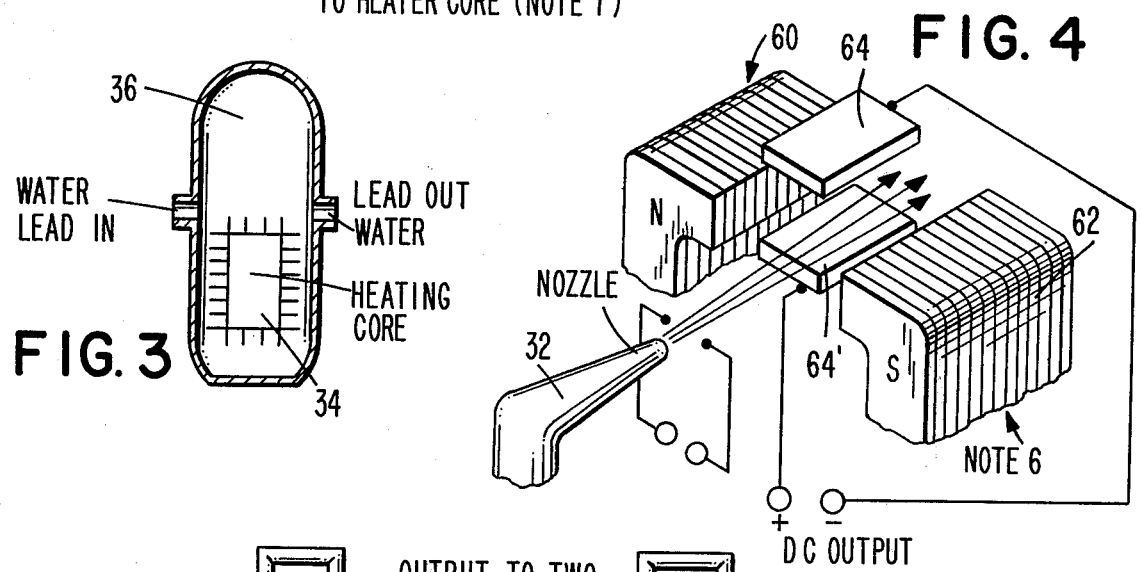
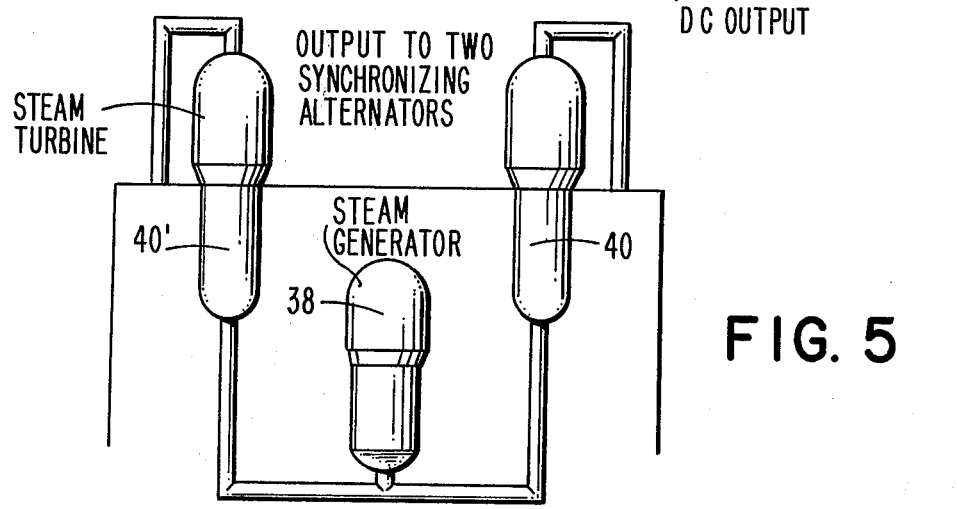

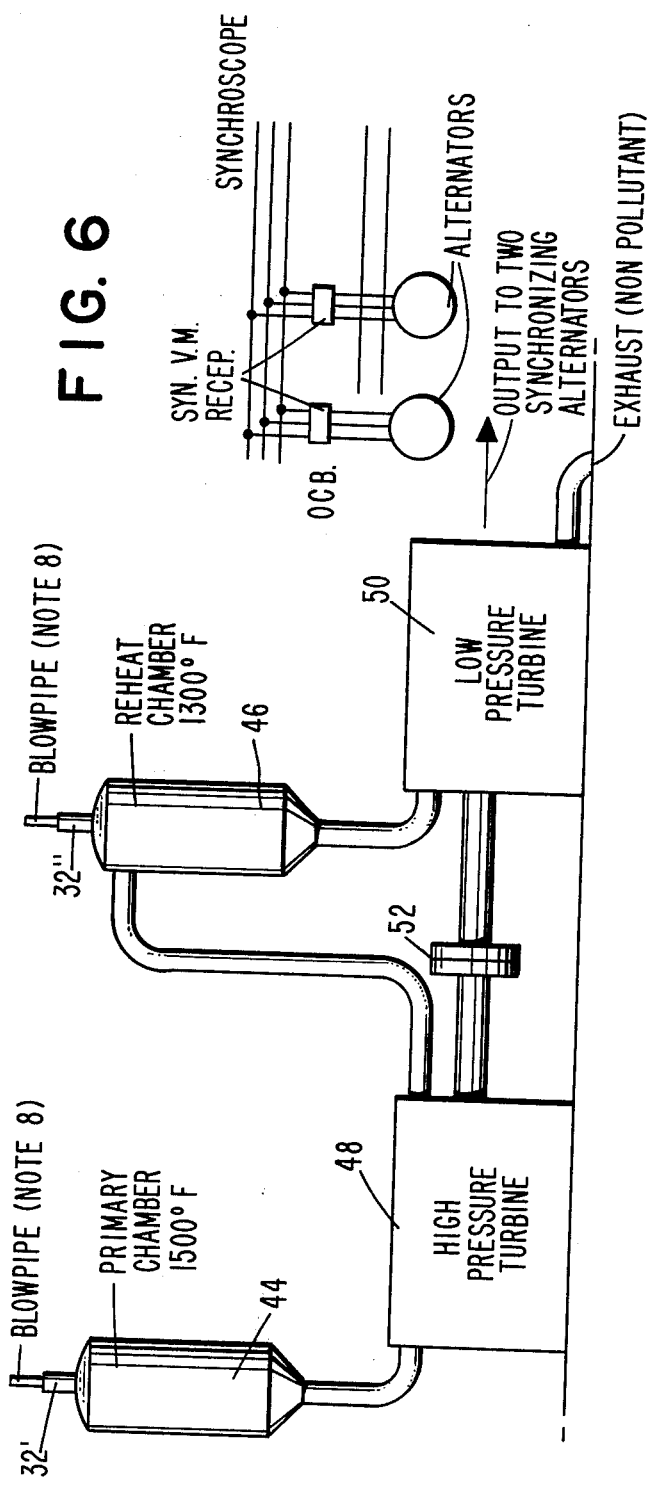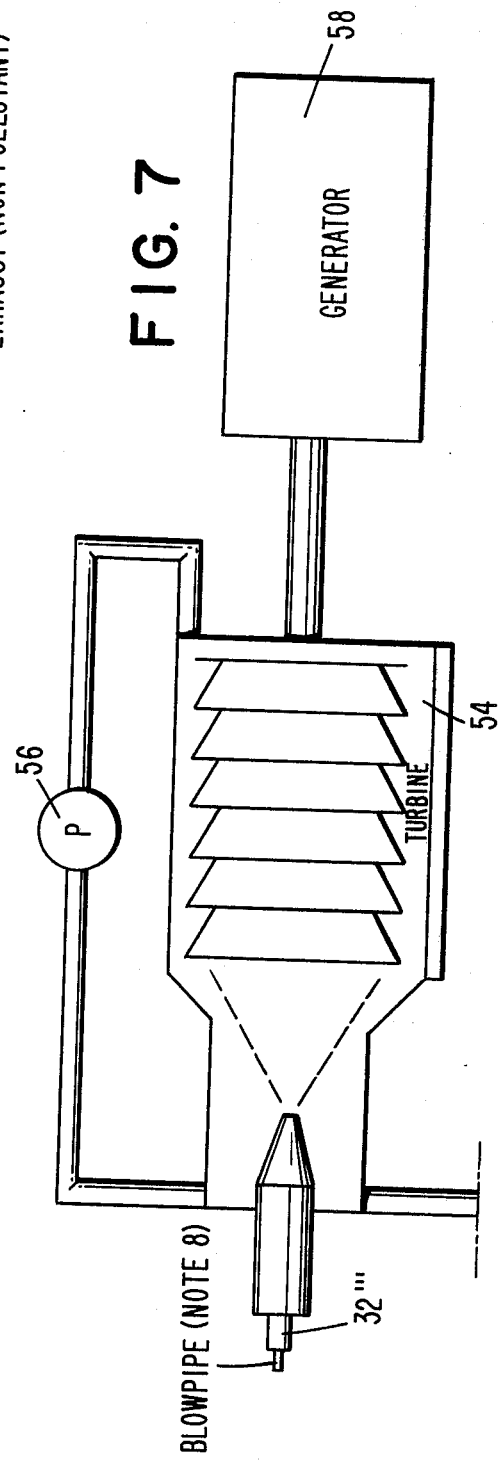

NON-POLLUTANT FUEL GENERATOR AND FUEL BURNER WITH A NON-POLLUTANT EXHAUST AND SUPPLEMENTARY D. C. GENERATOR

BACKGROUND OF THE INVENTION

The present invention relates, in general, to a system for producing and using non-polluting fuel for the production of heat and electricity. The basic fuel is hydrogen and any other gas released through the electrolysis of water. In fresh water, using sulfuric acid as a catalyst, the fuel would be hydrogen and oxygen. This fuel may be burned in any heating core with the combustion products being used not only to produce heat, but to generate electricity through the use of a magnetohydrodynamic generator. Such a system operates without polluting the atmosphere with its exhausts and provides heat and both mechanical and electrical power for virtually any use. Without limiting the potential uses of the energy so generated, the heat and power produced by the non-polluting system of the present invention may find use in the following areas.

1. Use in electric generators by Utilities.
2. Use in apartment heating plants.
3. Use in home heating units.
4. Use in ships with salt water.
   a. Note, electrolysis of salt water will supply hydrogen and chlorine which will burn and produce equal.
5. Use with Internal-Combustion Engine.
   a. Feed ration 2 LBH - 10).
   b. Exhaust gas water vapor non-polutant.
6. Use in small boats I. C. Engine
7. Use in automobiles I. C. Engine

SUMMARY OF THE INVENTION

Briefly, the invention discloses a method and apparatus for producing a fuel and for using that fuel to generate heat and electrical energy. The fuel is produced in an electrolyzer, in the preferred embodiment, with a solution of water and sulfuric acid producing hydrogen gas which may be stored in a suitable tank for later use. The hydrogen gas is a safe and non-polluting fuel which may be shipped in large quantities with a high degree of safety. The hydrogen gas, together with any other combustible gas released through the electrolysis of water, is pressurized and may then be supplied to a suitable burner associated with a conventional heating core whereby the heat of combustion may be used in the generation of steam for use in driving turbines, for heating uses and the like.

Combustion of the fuel mixture is accomplished by means of an electric arc, producing a very high temperature ionized gas which is directed through the magnetic field of a magnetohydrodynamic (MHD) generator immediately before or immediately after passing through the heating core. The MHD generator produces a direct current output which may be used for any desired purpose.

E. BRIEF DESCRIPTION OF DRAWINGS

The foregoing and additional objects, features and advantages of the invention will become apparent to those of ordinary skill in the art from a consideration of the following detailed description, taken in conjunction with the accompanying drawings, in which FIG. 1 is a diagrammatic illustration of a system for generating and utilizing non-polluting fuel in accordance with the present invention;

FIG. 2 is a diagrammatic illustration of a steam power system utilizing the fuel generated in the system of FIG. 1;

FIG. 3 is a diagrammatic illustration of a heating core usable in the arrangement of FIG. 2;

FIG. 4 is a diagrammatic illustration of an MHD generator usable in the system of FIG. 1;

FIG. 5 is a diagrammatic illustration of an alternate form of power producing system;

FIG. 6 is a diagrammatic illustration of a turbine power generator using the fuel produced by the system of FIG. 1; and FIG. 7 is a modified form of the system of FIG. 6.

DETAILED DESCRIPTION

Figure 1:
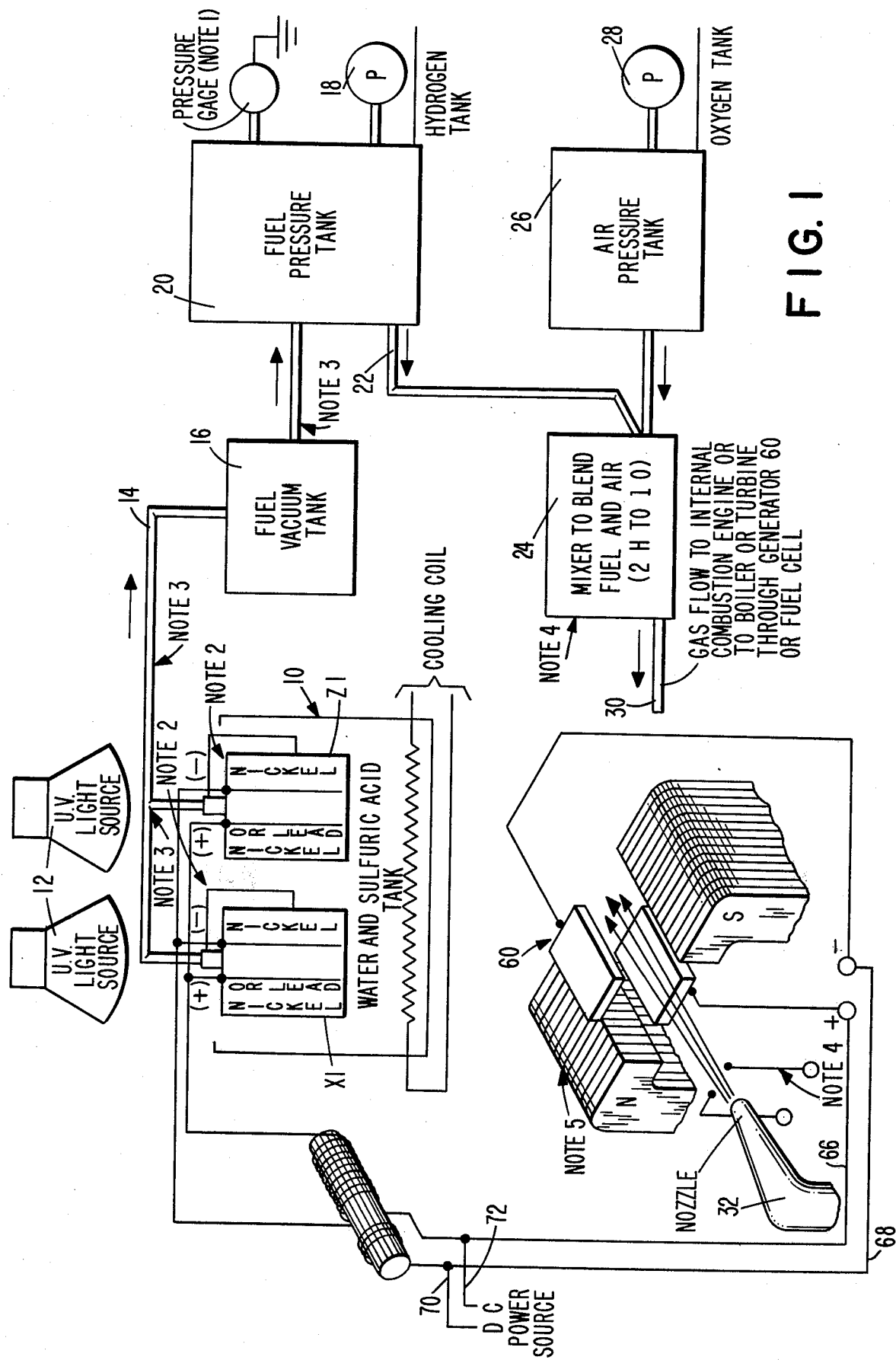

For clarity, certain legends have been omitted from the drawings, where indicated by "notes", and reference may be had to the following for an explanation of such notes:

Note 1: Pressure gage regulates electricity to generating tank 10.

Note 2: Water gage provided to release gas at set level to keep pressure out of generating tank 10.

Note 3: Pressure safety stop vacuum gage (-pressure to tank 16) provided.

Note 4: Gas ionized by arc under pressure. Use electric arc for ultraviolet light source at flame. Use tungsten electrodes.

Note 5: To regulate temperature increase or decrease pressure to 300 pounds per square inch to 7,000° F. Also, up to 4 H. to 1 o. straight fuel will increase temperature to 5,000° F burning hydrogen with oxygen only; regulate amperes to arc. Also could be done by using air pressure tank 26 and sending only negative (−) charge to nickel cathode in separate cell X1 and positive (+) to lead anode in separate cell Z1, or not using air from atmosphere; add extra vacuum tank for oxygen.

Note 6: Recycling program. Exhaust over a nickel catalyst at 250° C. The use of Fisher Tropsch Synthesis by adding hydrogen at this point produces liquid hydrocarbons or methane, synthetic gasolines which are less toxic.

Note 7: Oxyhydrogen torch uses hydrogen and oxygen fuel ignited by an electric arc. A nickel ignition chamber is used. For utraviolet light, arc electrodes are tungsten. Ignition chamber temperature: 700° C+. To regulate temperature in heating core, vary pressure of fuel to 300 lbs/in$^2$ to 7,000° F.; vary mixture of fuel up to 4 parts H to 1 part 0, to 5,000° F; vary amperes to arc to 7,000° F. Exhaust is non-polluting.

Note 8: Oxyhydrogen ignited by electric arc.

Referring now to FIG. 1, there is illustrated at 10 an electrolyzer which is utilized in the present invention to produce the non-polluting fuel which is to be burned. The electrolyzer is of conventional construction having one or more cathodes of nickel and anodes of a suitable material such as nickel or lead to which a source of direct current is supplied. The electrolyzer contains water and a suitable electrolyte such as sulfuric acid to produce oxygen and hydrogen. If desired, a source of ultraviolet light such as lamps 12 may be used in conjunction with the electrolytic tank 10 to assist in the generation of oxygen and hydrogen.

This is a simple application of fission and fusion. Commerical electrolyzers typically operate at efficiencies of about 60 to 70 percent—although some high-pressure prototypes may reach 85 percent. Future developments may increse this efficiency by using waste heat from the combustion process, thus be used to free the hydrogen and oxygen.

Compared to the present fossil fuel burners which give back no fuel, only polutants, my invention using these applications can be a great benefit for all mankind.

There is some concern—often called the "Hindenburg Syndrome" about the safety of hydrogen, but most such fears seem exaggerated noting the large quantities of hydrogen shipped and used both in this country and in Europe with a high degree of safety. Have you ever heard of a hydrogen spill?

The gaseous output from the electrolyzer 10 is supplied by way of a gas line 14 to a suitable fuel tank 16 which receives and temporarily stores, for example, the hydrogen produced by unit 10. A pump 18 transfers the fuel to a pressure tank 20 for storage or transportation under pressure. A suitable pressure regulating gauge (not shown) may be provided to regulate the pressure of the fuel in tank 20.

As required, the gaseous fuel from tank 20 may be supplied under pressure by way of line 22 to a suitable mixing chamber 24 where the fuel is mixed with air and the oxygen produced by the electrolyzer 10 which is stored in an air supply tank 24 which is also pressurized, as by means of pump 28. The resulting air and fuel mixture is then supplied by way of a fuel line 30 for utilization in an internal combustion engine, a heating core, or the like. In a preferred form of the invention, the air-fuel mixture is supplied to a burning nozzle 32 which acts as an oxyhydrogen torch. The fuel mixture is ignited by means of an electric arc, with the resulting flame being directed to a heating core 34 (FIGS. 2 and 3) located in a suitable boiler tank 36. The boiler contains water under high pressure which is then heated to a suitable temperature, which may be as high as 700° centigrade, by the combustion of the fuel and air mixture. The heated water is circulated through a heat exchanger in a steam generator 38, with the steam being utilized in conventional manner to drive a suitable turbine 40, which in turn may drive an electrical generator 42. As illustrated in FIG. 5, the steam generator 38 may be used to drive a pair of turbine generators 40 and 40' if desired.

The combustion products from the nozzle 32, which may also be referred to as a blow pipe, may be used directly to produce the steam for driving turbines, as illustrated, for example, in FIGS. 6 and 7, instead of utilizing the heating core arrangement of FIGS. 2 and 3. As shown in FIG. 6, the nozzles 32' and 32'' may be used to produce steam in primary chamber 44 and in a reheating chamber 46, with the output from the primary chamber being used to drive a high pressure turbine 48. The outflow of steam from turbine 48 is fed to the reheating chamber 46 where its temperature is raised and it is then fed to a second turbine 50. The two turbines may be mechanically coupled, as at 52, and the outputs of the turbines may be used to drive suitable electrical generators, as noted in FIG. 6. The exhaust from this system is a non-polluting exhaust. FIG. 7 is similar to the system of FIG. 6, but uses a recirculating fluid through a single turbine 54, the fluid being recirculated by means of a pump 56. Again, the turbine may be used to generate electricity by means of a suitable generator 58.

In all of the systems, additional electrical power can be obtained from the operation of the nozzle, or blow pipe, 32 through the provision of a magnetohydrodynamic generator generally indicated at 60 in FIGS. 1 and 4. By reason of its ignition, by means of an electrical arc, the combustion products from nozzle 32 comprise a high temperature stream of ionized gas.

The actual flame or stream of ionized gas is directed at high speed between the poles of a magnet and also between two electrodes, the resulting electro-magnetic force produces lateral movement of the charged carries; ie. a Hall effect between the electrodes thus setting up a potential difference between them. The arrangement is shown schematically on FIGS. 1 and 4. The magnet is illustrated at 62 and the output electrodes at 64 and 64'. As is known in the MHD generator art, the flow of a hot ionized gas through a magnetic field generates an electric potential between electrodes 64 and 64', producing a direct current output on lines 66 and 68 (FIG. 1), which output may be used for any desired purpose, and in particular may be used to assist in the electrolysis of water for the production of the fuel used in the present system. Additional electrical power requirements of the electrolyzer may be obtained from a source of direct current by way of lines 70 and 72. This method of generating electricity has the advantage that it lends itself to large plant sizes and can be integrated into the conventional thermal generating stations. No complicated moving parts exposed to high temperatures are required. The fuel must be ignited by an electric arc using tungsten electrodes to produce an Ultra-Violet light source after the hydrogen molecules become converted into more reactive atoms by passing a nickel catalyst. At this point it would be helpful to quote Pashen' law. "The spark potential between electrodes in a gas depends on the length of the spark gap and the pressure of the gas in such a way that it is directly proportional to the mass of gas between the two electrodes; ie. the sparking potential is a function of the pressure times the density of the gas."

To regulate the temperature in the heating core 34 and to maintain it at about 700° centrigrade, the pressure of the fuel is controlled to a maximum of 300lbs. per square foot. In addition, control is obtained by regulating the mixture of the fuel and air, and by controlling the current flow to the arc ignition electrodes. With maximum current flow, the arc may produce a temperature of up to 7000° F. The use of tungsten electrodes produces ultraviolet light. Further control is obtained by regulating the mixture of the fuel up to 4H and 10 or 4 hydrogen to 1 oxygen.

The size of blow pipe can vary although I have burnt mixture with standard busnen burner. The size of combustion chamber can vary depending on B.T.U. required. Size of M. H. D. generator can be integrated into the chamber of conventional thermal generating station to yield a direct current for the electrolysis of water to take place at the fuel generator.

Detailed description of fuel generator. Hydrogen is released at cathode. Use nickel cathode and an ode. The best electrolyte for fresh water is sulfuric acid $H_2SO_4 + H_2O +$ direct current = +oxygen hydrogen. Please note other catalysis — sunlight or ultra violet light source. Zink holding tank can be used. Storage tanks with safety features as per FIG. I.

What is claimed:

1. A non-polluting fuel generator and fuel burner with a non-polluting exhaust and supplemental DC generator for producing usable heat and electrical power, comprising:
an electrolytic generator for producing hydrogen and oxygen gases from a supply of water, said electrolytic generator including electrode means immersed in the water, and means for applying a direct current electrical potential to said electrode means;
storage means for receiving and storing under pressure said hydrogen and oxygen gases;
mixer means for receiving said gases from said storage means and for blending said gases with air to produce a fuel and air mixture;
a burning nozzle;
means for feeding said fuel and air mixture under pressure to said nozzle, said mixture exiting said nozzle in a stream;
electrical arc means for igniting said fuel mixture stream to produce a hot, ionized stream of combustion products;
heating core means for receiving said combustion products and for heating water to produce steam usable in the production of mechaical power; and
magnetohydrodynamic means interposed in said stream of hot ionized combustion products for the generation of direct current electrical power, said combustion products being non-polluting.

2. The apparatus of claim 1, wherein said electrical arc means includes tungsten electrodes across which said arc discharges to ignite said fuel mixture, said arc discharge producing an ultraviolet light, and means for directing said ultraviolet light into said supply of water to assist in the electrolysis thereof.

3. The apparatus of claim 2, further including means for feeding said direct current electrical power to the electrode means in said electrolytic generator for assisting in the production of said hydrogen and oxygen gases.

* * * * *